B. FORD.
SECONDARY OR STORAGE BATTERY.
APPLICATION FILED JAN. 27, 1914.
1,095,722.
Patented May 5, 1914.
2 SHEETS—SHEET 1.
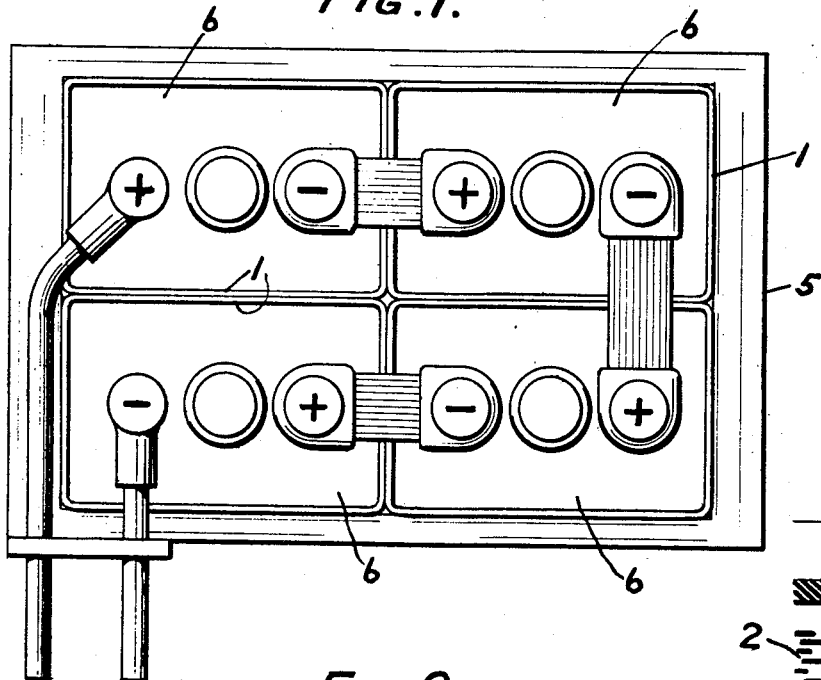
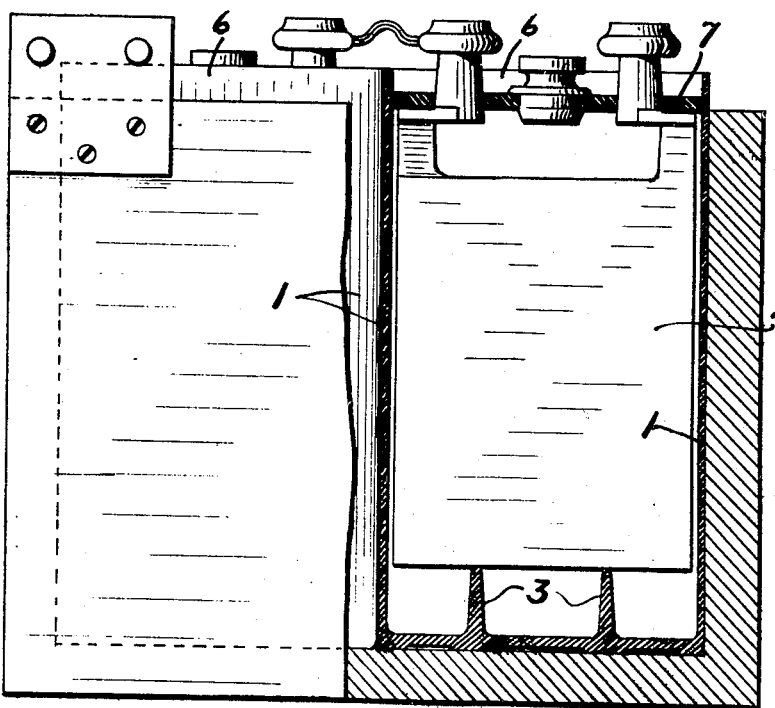
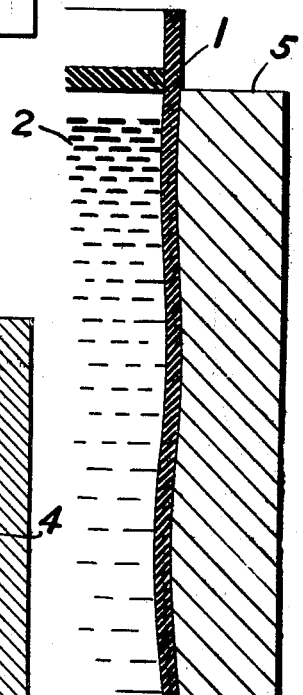
WITNESSES:
INVENTOR
Bruce Ford
BY
Augustus B Stoughton
ATTORNEY.

B. FORD.
SECONDARY OR STORAGE BATTERY.
APPLICATION FILED JAN. 27, 1914.

1,095,722.

Patented May 5, 1914.

2 SHEETS—SHEET 2.

WITNESSES:
Robt R Kirche
Frank E French

INVENTOR
Bruce Ford
BY
Augustus B. Stoughton,
ATTORNEY.

UNITED STATES PATENT OFFICE.

BRUCE FORD, OF PHILADELPHIA, PENNSYLVANIA.

SECONDARY OR STORAGE BATTERY.

1,095,722.  Specification of Letters Patent.  Patented May 5, 1914.

Application filed January 27, 1914. Serial No. 814,636.

*To all whom it may concern:*

Be it known that I, BRUCE FORD, a citizen of the United States, and a resident of Philadelphia, in the county of Philadelphia and State of Pennsylvania, have invented certain new and useful Improvements in Secondary or Storage Batteries, of which the following is a specification.

The principal object of the present invention is to oppose, prevent or minimize the breaking of so-called rubber jars.

The invention consists in the combination to be presently described and finally claimed.

Figure 3:
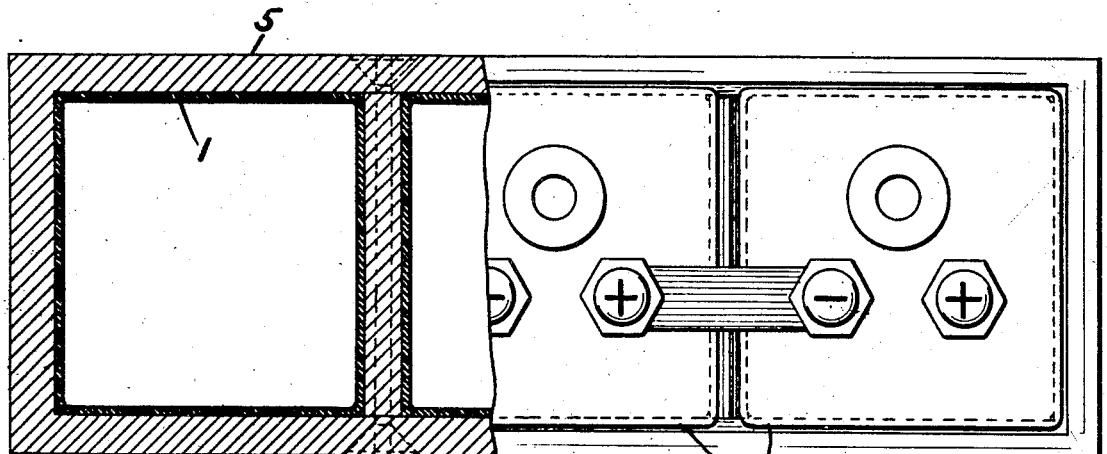
Figure 4:
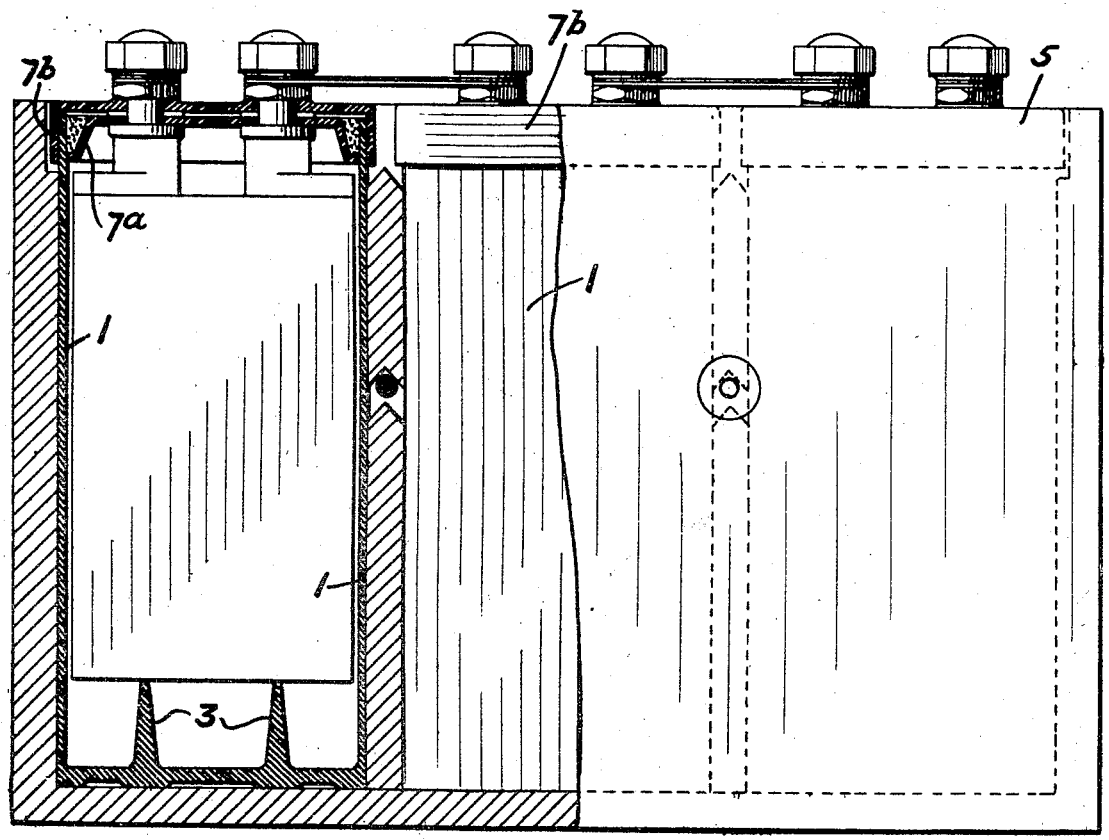

In the accompanying drawings, Figure 1 is a top or plan view of a storage battery embodying the combination of the invention. Fig. 2, is a side view of the same partly in section, Fig. 3, is a top or plan view, partly in section of a storage battery embodying the combination of the invention but differing somewhat in details. Fig. 4, is a side view, partly in section, of the apparatus shown in Fig. 3, and Fig. 5, is a diagrammatic sectional view illustrative of the mode of operation and results of the combination.

In the drawings 1 is the flexible, plastic jar wall of insulating rubber material which is initially incapable when subjected to the heat incident to the operation of the battery of sustaining the fluid pressure of the electrolyte 2, without undue bulging and which with time may become hard and brittle. By rubber material is meant those well known compounds which are usually referred to as hard rubber but which as is well known may contain many ingredients besides rubber and sulfur. The flexible and plastic quality of the wall may be imparted to it by incomplete vulcanization or by the proportion of the compounds which enter into the rubber material. After the rubber sets in the processes as indicated, and by reason of those processes the rubber will by age and heat become hard and brittle.

3, are rigid and unyielding plate supports or ribs which form a part of or are vulcanized to the bottom jar wall. The weight of the plates 4 and their accessories is carried by the rigid unyielding ribs 3.

5, are rigid supporting walls and they constitute the walls of a box or tray. As shown in Figs. 1 and 2 some of the walls of each jar 6 abut upon each other, but the wall 5 abuts upon some of the jar walls. As shown in Figs. 3 and 4, there is a wall 5 completely surrounding each jar. The cover 7 as shown in Fig. 2 fits inside of the jar walls 1 and so opposes any tendency which they might have to collapse inward by reason of their flexible or plastic quality. This same result is accomplished as shown in Fig. 4 by having a part 7ª of the cover arranged within the walls 1, while the part 7ᵇ of the cover is arranged outside of the walls 1.

The operation is that the rigid supporting walls 5 supply the necessary strength for preventing the jar walls 1 from unduly bulging under the pressure of the electrolyte 2, so long as the jar walls 1 remain flexible and plastic. Of course the time is not essential but the walls 1 may remain plastic and flexible for from six months to a couple of years or more. However, when the jar walls 1 become rigid and perhaps brittle, they are not subjected to undue strains because while they were plastic and yielding they conformed to the surface, or perhaps more accurately, to inequality of the surface of the walls 5, as shown in Fig. 5, so that when the jar walls do become hard and unyielding their entire contacting surface is supported by the rigid wall 5. The result is that the walls 1 being initially soft and yielding, as distinguished from being brittle, are not subject to breakage and since they are supported by the walls 5 they can resist the fluid pressure without undue bulging and in course of time when the walls 1 become hard and rigid, they are so supported all over their surface that they are not subjected to strain and hence are not likely to break. In these two ways breakage of the jars is opposed, minimized or prevented, while at the same time the battery is satisfactory.

What I claim is:

1. In an electric storage battery the combination of flexible plastic jar walls of insulating hard rubber material which with time become hard and brittle, and separable rigid supporting walls to which the jar walls conform while plastic and which support the entire contacting surface of the jar walls when they become hard and brittle whereby breakage of jars is minimized.

2. In an electric storage battery the combination of flexible plastic jar walls of insulating hard rubber material which with time become hard and brittle, separable rigid supporting walls to which the jar walls conform while plastic and which support the entire contacting surface of the jar walls when they become hard and brittle, whereby breakage of jars is minimized, and a cover engaging the inside of the jar walls.

3. In an electric storage battery the combination of flexible plastic jar walls of insulating rubber material which with time become hard and brittle, rigid supporting walls to which the jar walls conform while plastic and which support the entire contacting surface of the jar walls when they become hard and brittle, whereby breakage of jars is minimized, and a cover engaging the inside and outside of the jar walls.

4. In an electric storage battery the combination of flexible plastic jar walls of insulating material which is initially flexible and plastic and incapable of sustaining the fluid pressure and which with time become hard and brittle, rigid unyielding plate supporting ribs forming part of the bottom jar walls, plates on said ribs, electrolyte confined by the jar walls, and separable rigid supporting walls which support the jar walls while flexible and plastic and to which the jar walls conform while flexible and plastic and which support the entire contacting surface of the jar walls when they become brittle, whereby breakage of jars is minimized, opposed or prevented.

5. In an electric storage battery the combination of flexible plastic jar walls of insulating material which is initially flexible and plastic and incapable of sustaining the fluid pressure and which with time become hard and brittle, rigid unyielding plate supporting ribs forming part of the bottom jar walls, plates on said ribs, electrolyte confined by the jar walls, separable rigid supporting walls which support the jar walls while flexible and plastic and to which the jar walls conform while flexible and plastic and which support the entire contacting surface of the jar walls when they become brittle, whereby breakage of jars is minimized, opposed or prevented, and a cover engaging the inside of the jar walls.

6. In an electric storage battery the combination of flexible plastic jar walls of insulating material which is initially flexible and plastic and incapable of sustaining the fluid pressure and which with time become hard and brittle, rigid unyielding plate supporting ribs forming part of the bottom jar walls, plates on said ribs, electrolyte confined by the jar walls, separable rigid supporting walls which support the jar walls while flexible and plastic and to which the jar walls conform while flexible and plastic and which support the entire contacting surface of the jar walls when they become brittle, whereby breakage of jars is minimized, opposed and prevented, and a cover engaging the inside and outside of the jar walls.

BRUCE FORD.

Witnesses:
CLIFFORD K. CASSEL,
FRANK E. FRENCH.